Oct. 11, 1949.　　　　T. E. GORDON　　　　2,484,496
OSCILLATING PLOW

Filed Oct. 4, 1948　　　　　　　　　　　　3 Sheets-Sheet 1

Thomas E. Gordon
INVENTOR.

BY *Clarence A. O'Brien*
*and Harvey B. Jackson*
Attorneys

Oct. 11, 1949.                T. E. GORDON                  2,484,496
                             OSCILLATING PLOW
Filed Oct. 4, 1948                                    3 Sheets-Sheet 2

Thomas E. Gordon
   INVENTOR.

BY Thomas A. O'Brien
and Harvey B. Jacobson
                  Attorneys

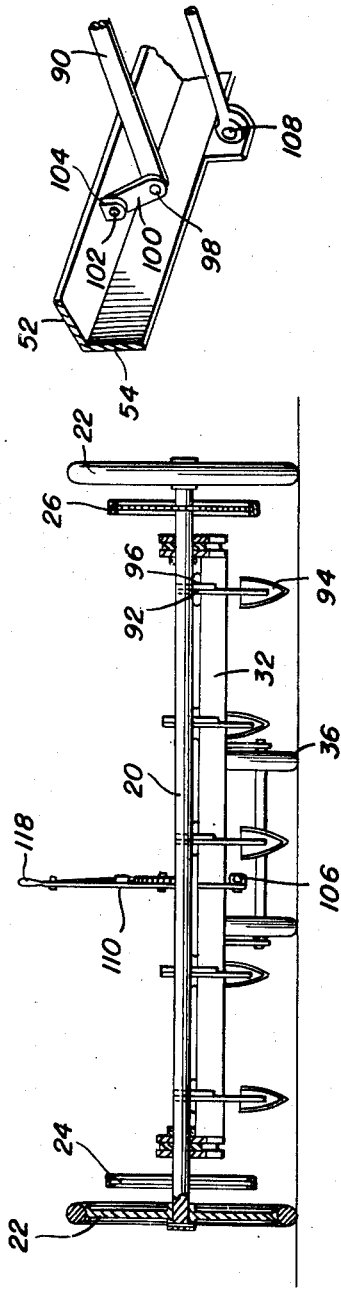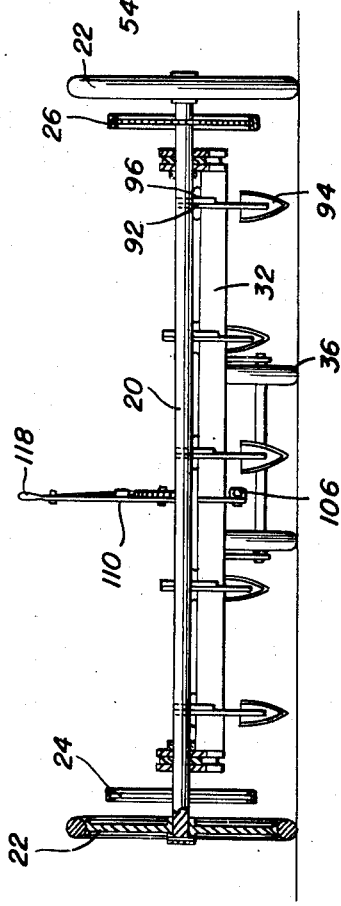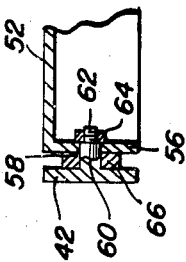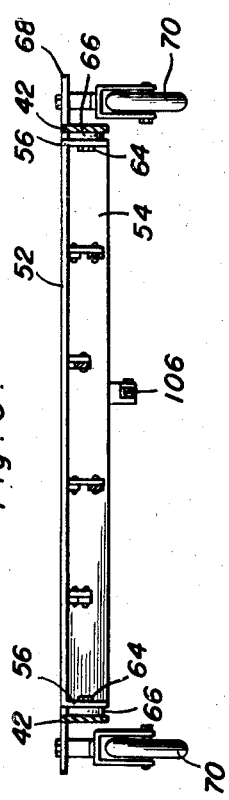
Thomas E. Gordon
INVENTOR.

Patented Oct. 11, 1949

2,484,496

UNITED STATES PATENT OFFICE 2,484,496

OSCILLATING PLOW

Thomas E. Gordon, Jamestown, N. Dak., assignor of fifty per cent to Cletus A. Kirkpatrick, Williston, N. Dak.

Application October 4, 1948, Serial No. 52,637

1 Claim. (Cl. 97—55)

This invention relates to a plow of the type adapted to be drawn across a field by a tractor or other draft means and it is one object of the invention to provide a plow wherein the blades are suspended from a blade-carrying wheeled frame so mounted that they may have oscillating movement.

Another object of the invention is to provide a plow wherein oscillating movement is imparted to the shafts upon which the plow blades are mounted by means of sprockets associated with the wheels carried by the frame so that oscillation of the plow blades is accomplished merely by pulling the wheeled frame across a field.

Another object of the invention is to provide an oscillating plow with means for adjustably raising and lowering the plow blades, which means consists of a frame associated with the blade-carrying shafts which is pivotally mounted on the wheel-carrying shaft, and lever means for raising and lowering the frame relative to the field being plowed.

Yet another object of the invention is the provision of an oscillating plow which is simple in construction and efficient in operation and which may be readily and easily repaired.

These, together with various ancillary objects and features of the invention which will later become apparent as the following description proceeds, are attained by the device, a preferred embodiment of which has been illustrated by way of example only in the accompanying drawings, wherein:

Figure 4 is a transverse vertical sectional view taken substantially on the plane of section line 4—4 of Figure 1;

Figure 5 is another transverse vertical sectional view taken substantially on the plane of section line 5—5 of Figure 1;

Figure 6 is a perspective view of the rear end of the frame showing the manner of attaching the lever actuating rod and a plow-carrying shaft; and Figure 7 is a transverse vertical sectional view taken substantially on the plane of section line 7—7 of Figure 1.

Specific reference is now made to the drawings. In the several views in the accompanying drawings and in the following specification, similar reference characters indicate corresponding elements throughout.

Figure 1:
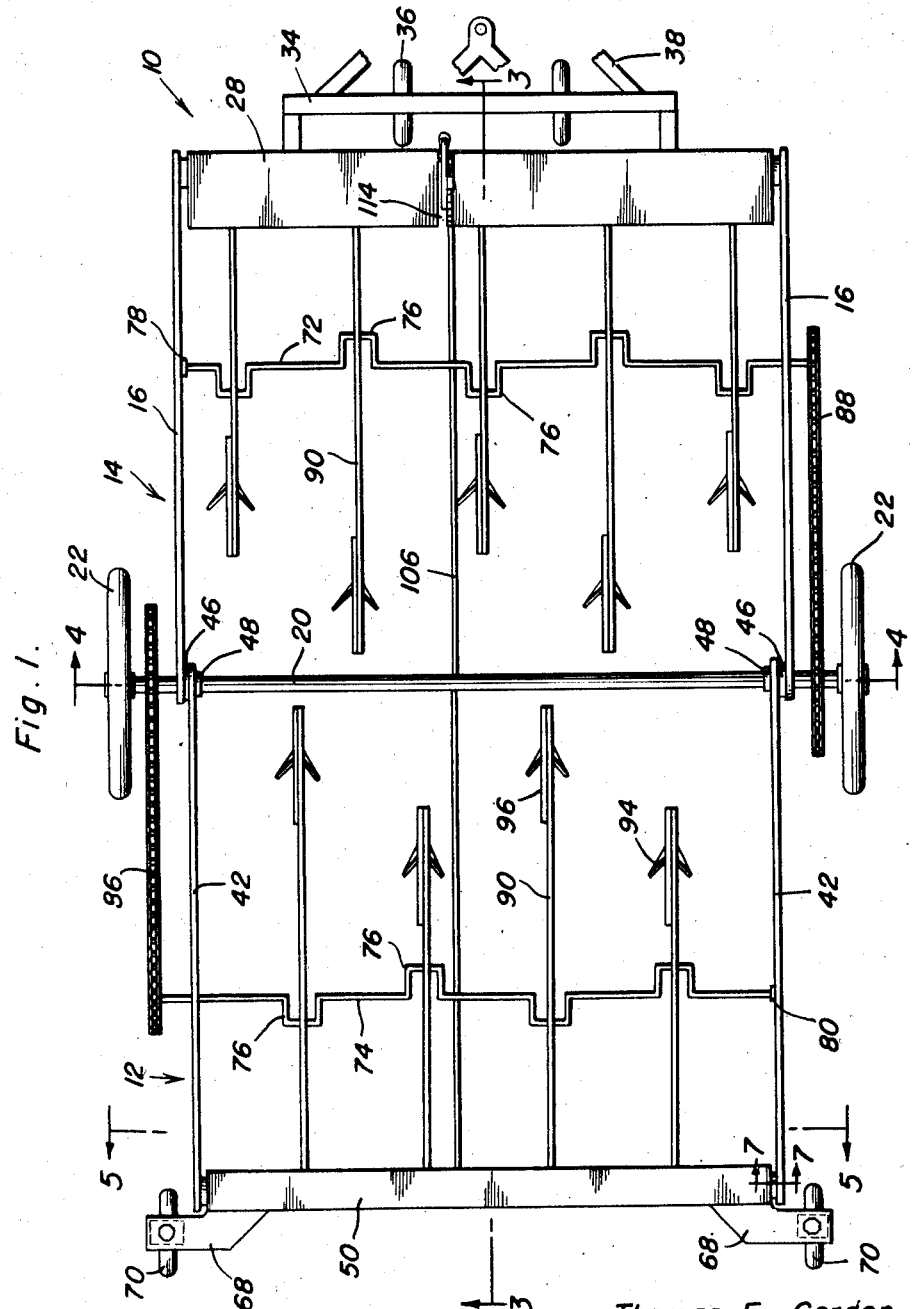
Figure 1 is a top plan view of the plow of the instant invention.
Figure 2:
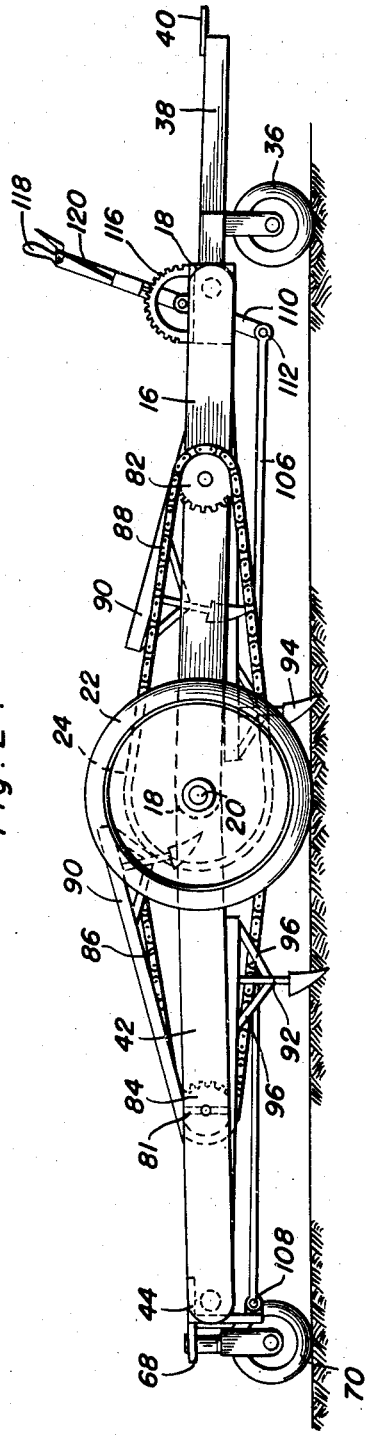
Figure 2 is a side elevational view of the plow.
Figure 3:
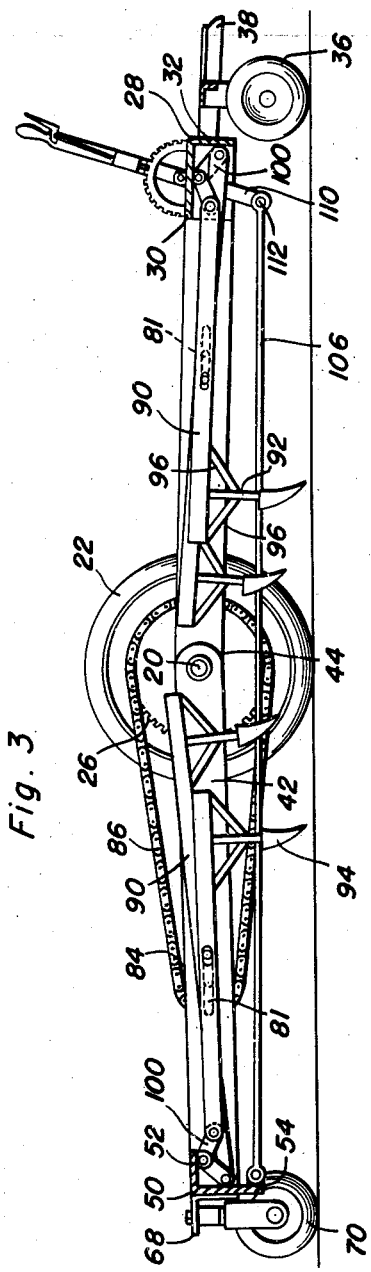
Figure 3 is a longitudinal vertical sectional view of the plow taken substantially on the plane of section line 3—3 of Figure 1.

Generally indicated at 10 is a wheeled frame which consists essentially of two sections, a rear section 12 and a forward section 14. The forward section consists of a pair of spaced parallel side plates or members 16 which are preferably rounded at their extremities as at 18 and which are provided with apertures at these extremities for pivotally mounting these side members on a transverse shaft 20 which extends beyond the side members and carries a pair of wheels 22 at its extremities. Fixedly secured to the shaft 20 intermediate the wheels and the side members 16, a pair of sprockets 24 and 26 are provided whose functions will be set forth hereinafter.

Connecting the side members 16 at their forward ends is a transverse member 28 which is in the form of an angle iron having a horizontal arm 30 and a vertical arm 32.

Suitably mounted to the transverse member 28 as by riveting or welding is a frame 34 which supports a pair of relatively small wheels 36. A pair of converging arms 38 are welded or riveted to the frame 34 carrying an eye lug 40 to which a tractor pull bar (not shown) is normally attached.

The rear section 12 consists of a pair of spaced parallel side plates or members 42 which, like the side members 16, are preferably rounded at their extremities as at 44. The forward extremities of the side members 42 are provided with apertures for pivotally mounting these members on the central transverse shaft 20. As seen in Figure 1, these side members 42 are mounted on the shaft inwardly of the side members 16. Suitable washers 46 are carried by the shaft to separate the side members 16 and 42 from each other. A pair of washers 48 are fixedly secured to the shaft 20 adjacent the side members 42 to limit their inward movement on the shaft.

As in the case of the forward frame member 14, the side members 42 are connected at their rear extremities by means of a transverse member 50 which is also in the form of an angle iron having a horizontal arm 52 and a vertical arm 54. The extremities of the transverse member 50 carry a pair of integral vertical plates 56 each provided with an aperture 58. Depending from the extremities of the side members 42, a pair of cylindrical lugs 60 are provided which are journaled in the apertures 58. The lugs 60 are recessed and screw-threaded at their extremities as at 62 to receive a suitable nut 64. Between the side members 42 and the arms 56 suitable washers 66 are provided.

Mounted on the transverse member 50 at its extremities, as by welding or riveting, are a pair of transverse wheel supporting brackets 68 suitably apertured to removably retain thereon a pair of caster-type wheels 70.

Intermediate their extremities, the side members 16 and 42 support a pair of transverse plow-actuating shafts 72 and 74, respectively, which are provided with a series of integral alternate oppositely disposed U-shaped crank throws 76 or longitudinally spaced offsets. One set of extremities of the shafts 72 and 74 is suitably and rotatably journaled in the side members 16 and 42, as at 78 and 80, respectively, while the other set of extremities passes through suitable slotted apertures 81 in the side members 16 and 42. These latter extremities carry a pair of sprockets 82 and 84. A pair of endless chains 86 and 88 entrain the sprockets 24 and 84 and 26 and 86, respectively. Thus, as the wheels 22 are caused to roll forward, the plow-actuating shafts 72 and 74 are caused to rotate in the same relative direction.

A plurality of spaced parallel plow-supporting rods 90 are provided which are disposed longitudinally of the frame 16, each of which rods overlies a U-shaped throw 76. At their extremities proximate the wheel-supporting shaft 20, these rods are provided with vertical depending arms 92 to which are secured conventional, arcuate, arrow-shaped plow blades 94. Each rod is further provided with a pair of downwardly and inwardly inclined brace arms 96 as further support means for the plow blades 94. At their other extremities, the rods 90 are hingedly secured to the angle iron arms 52 and 38 as best shown in Figure 6. Each rod is apertured at its extremity to receive via a suitable bolt 98 an arm 100 which, in turn, is hingedly secured via a bolt 102 to an apertured vertical depending lug 104.

Extending longitudinally beneath the rods 90 substantially across the entire length of the frame 10, a lever-actuated rod 106 is provided which is pivotally secured at its rear end to the angle iron arm 54 by means of a suitable bolt 108 and at its forward end to a lever arm 110 via a bolt 112. This lever arm 110 extends through a slot 114 provided therefor in the transverse member 28. A semi-circular serrated plate 116 is suitably mounted on the member 28 adjacent the slot 114. The lever arm 110 is provided at its extremity with a handle 118 and a spring 120 for adjustably engaging the serrated plate 16. Thus, by moving the arm 110 forward, the plow blades will be lowered, while moving it back, the plow blades will be raised.

In practical operation, as the plow itself is pulled across a field to be tilled by a tractor, the plow-actuating shafts will be caused to rotate about a transverse axis. The crank throws on the shafts will alternately raise and lower the blade-supporting longitudinal rods, imparting oscillating motion to the plow blades.

In view of the foregoing description taken in conjunction with the accompanying drawings, it is believed that a clear understanding of the device will be quite apparent to those skilled in the art. A more detailed description is accordingly deemed unnecessary.

Having described the invention, what is claimed as new is:

An oscillating plow adapted to be drawn by a tractor or the like comprising a main shaft, wheels carried by said main shaft, a wheeled frame including two sections each having spaced parallel side members and a transverse member secured to the outer extremities of said side members, means for pivotally securing the inner extremities of said side members to said main shaft adjacent said wheels, transverse spaced parallel plow actuating shafts rotatably mounted on said frame sections, longitudinal spaced parallel blade-supporting rods hingedly secured to said frame sections and operatively overlying said shafts, plow blades carried by the free ends of said rods, means associated with said main shaft and said transverse shafts whereby said transverse shafts are rotated as the main shaft rotates, and lever means for adjustably raising and lowering said plow blades, said lever means including a longitudinal rod pivotally secured at one extremity to one of said frame sections, a spring-actuated arm slidably, rotatably and adjustably mounted on the other of said frame sections, the other extremity of said longitudinal rod being pivotally secured to said arm.

THOMAS E. GORDON.

REFERENCES CITED

The following references are of record in the file of this patent:

UNITED STATES PATENTS

| Number | Name | Date |
|---|---|---|
| 641,619 | Anderson | Jan. 16, 1900 |

FOREIGN PATENTS

| Number | Country | Date |
|---|---|---|
| 15,330/33 | Great Britain | Nov. 23, 1934 |
| 366,296 | Germany | Jan. 3, 1923 |